(12) United States Patent
Yoshida et al.

(10) Patent No.: US 9,410,284 B2
(45) Date of Patent: Aug. 9, 2016

(54) CUSHIONING-MATERIAL SURFACE LAYER AND HOT-PRESS CUSHIONING MATERIAL

(75) Inventors: Akira Yoshida, Kanuma (JP); Takamitsu Ozeki, Kanuma (JP)

(73) Assignee: Yamauchi Corporation, Osaka (JP)

( * ) Notice: Subject to any disclaimer, the term of this patent is extended or adjusted under 35 U.S.C. 154(b) by 282 days.

(21) Appl. No.: 14/123,441

(22) PCT Filed: Jun. 7, 2011

(86) PCT No.: PCT/JP2011/063042
§ 371 (c)(1),
(2), (4) Date: Dec. 2, 2013

(87) PCT Pub. No.: WO2012/169011
PCT Pub. Date: Dec. 13, 2012

(65) Prior Publication Data
US 2014/0120792 A1 May 1, 2014

(51) Int. Cl.
*D06N 3/18* (2006.01)
*B32B 25/10* (2006.01)
(Continued)

(52) U.S. Cl.
CPC .............. *D06N 3/186* (2013.01); *B30B 15/061* (2013.01); *B32B 5/26* (2013.01); *B32B 25/10* (2013.01);
(Continued)

(58) Field of Classification Search
CPC ............ B29C 43/203; B32B 2260/023; B32B 2260/046; B32B 2260/048; B32B 25/10; B32B 27/12; B32B 5/26; D06N 3/0006; D06N 3/0022; D06N 2/0022; D06N 3/0025; D06N 3/0034; D06N 3/0063; D06N 3/047; D06N 3/10; D06N 3/186; Y10T 442/2066

USPC ......................................................... 428/319.3
See application file for complete search history.

(56) References Cited

U.S. PATENT DOCUMENTS

| 2006/0014463 | A1 | 1/2006 | Yoshida | |
|---|---|---|---|---|
| 2010/0251908 | A1* | 10/2010 | Yoshida | B29C 43/18 100/38 |
| 2014/0120792 | A1* | 5/2014 | Yoshida | B32B 25/10 442/67 |

FOREIGN PATENT DOCUMENTS

| EP | 1839833 A1 | 10/2007 |
|---|---|---|
| EP | 2098350 A1 | 9/2009 |

(Continued)

OTHER PUBLICATIONS

International Search Report for corresponding Application No. PCT/JP2011/063042 issued Sep. 13, 2011.
(Continued)

*Primary Examiner* — Arti Singh-Pandey
(74) *Attorney, Agent, or Firm* — Ditthavong & Steiner, P.C.

(57) ABSTRACT

The cushioning-material surface layer 11a includes a resin layer 12 disposed on one side of the surface layer 11a to cover the side thereof, a rubber layer 13 disposed on the other side of the surface layer 11a to cover the side thereof, and a woven fabric layer 14 disposed between the resin layer 12 and rubber layer 13 and including bulked yarns for at least one of warp and weft. The woven fabric layer 14 includes a woven fabric-resin composite layer 17 disposed on the resin layer 12 side and formed by impregnating part of the woven fabric with resin that forms the resin layer 12, and a woven fabric-rubber composite layer 18 disposed on the rubber layer 13 side and formed by impregnating part of the woven fabric with rubber that forms the rubber layer 13. The woven fabric layer 14 includes interstices 20 therein.

10 Claims, 4 Drawing Sheets

(51) Int. Cl.
*B32B 5/26* (2006.01)
*B32B 27/12* (2006.01)
*D06N 3/00* (2006.01)
*D06N 3/04* (2006.01)
*D06N 3/10* (2006.01)
*B30B 15/06* (2006.01)
*B29C 43/20* (2006.01)
*B32B 37/26* (2006.01)

(52) U.S. Cl.
CPC ............ *B32B 27/12* (2013.01); *D06N 3/0006* (2013.01); *D06N 3/0022* (2013.01); *D06N 3/0025* (2013.01); *D06N 3/0034* (2013.01); *D06N 3/0063* (2013.01); *D06N 3/047* (2013.01); *D06N 3/10* (2013.01); *B29C 43/203* (2013.01); *B32B 2037/266* (2013.01); *B32B 2260/023* (2013.01); *B32B 2260/046* (2013.01); *B32B 2260/048* (2013.01); *Y10T 442/2066* (2015.04)

(56) References Cited

FOREIGN PATENT DOCUMENTS

| | | |
|---|---|---|
| EP | 2221161 A1 | 8/2010 |
| JP | H0929897 A | 2/1997 |
| JP | 3221978 B2 | 8/2001 |
| JP | 2003170458 A | 6/2003 |
| JP | 2003-211599 A | 7/2003 |
| JP | 2004-344962 A | 12/2004 |
| JP | 2005-178302 A | 7/2005 |
| JP | 2006-192786 A | 7/2006 |
| JP | 2009-137208 A | 6/2009 |
| JP | 2011-116034 A | 6/2011 |
| TW | 201116410 A | 5/2011 |

OTHER PUBLICATIONS

European Office Action for related European Patent Application No. 11867167.6 -1706 dated Dec. 22, 2015, 8 Pages.

* cited by examiner

CUSHIONING-MATERIAL SURFACE LAYER AND HOT-PRESS CUSHIONING MATERIAL

TECHNICAL FIELD

This invention relates to surface layers of cushioning materials used in hot presses and the cushioning materials, and more particularly, to a hot-press cushioning material and a cushioning-material surface layer that are used, in processes of manufacturing printed circuit boards, such as copper clad laminated plates, flexible printed circuit boards, and multi-layered boards, IC cards, liquid crystal panels, and precision apparatus parts, such as ceramic laminated plates (hereinafter, referred to as "laminated plates"), to subject the aforementioned target products to a press forming process or thermal compression bonding process.

BACKGROUND ART

The manufacturing process of a laminated plate begins with stacking laminated plate materials to prepare an object that will be compressed. After being delivered between hot platens, the object is applied with heat and pressure by a hot press, or a press, to fluidize and cure thermoplastic resin or thermosetting resin contained in the laminated plate materials to make the materials into one piece.

If the hot platens and the delivered object, which is the object to be compressed, have uneven thickness, thermal strains, temperature nonuniformity and so on in the hot pressing process, uniform temperature and pressure cannot be applied to the object, which will later become a product. As a result, the final product may have defects such as thickness defects, cracks and warpage. In order to resolve the problems including the thickness defects of the products, hot-press cushioning materials (hereinafter, sometimes referred to as simply "cushioning material) are used during press formation.

The cushioning materials are required to have, in addition to the good cushioning properties to resolve the thickness defects and other problems of the products as described above, heat resistance, good releasability from a hot platen in contact therewith, and so on. In terms of releasability improvement, recent cushioning materials sometimes include cushioning-material surface layers (hereinafter, sometimes referred to as simply "surface layer") over the outer surfaces thereof, in addition to a cushion body with cushioning properties.

Technology related to the hot-press cushioning materials with the surface layers is disclosed in Japanese Unexamined Patent Application Publication Nos. 2004-344962 (Patent Literature 1) and Japanese Patent No. 3221978 (Patent Literature 2).

The hot-press sheet, disclosed in Patent Literature 1, is a cushioning-material surface layer that includes a sheet-shaped base material and a release coating film formed over the base material. The coating film is made of a resin composition in which 5% to 55% by mass of organic powder and 5% to 55% by mass of inorganic powder are mixed in 100% by mass of the resin composition so that the mixture of the organic powder and the inorganic powder becomes 30% to 60% by mass in total. The release coating film formulated as above is intended to prevent formation of sinks and dents in the release coating film on the outer surfaces of the hot-press sheet.

Patent Literature 2 discloses, in terms of heat resistance improvement, a heat-resistant thermo-sensitive adhesive sheet, that corresponds to the cushioning-material surface layer, of a cushioning material used for hot-press formation. The adhesive sheet is made by applying unvulcanized fluororubber over both surfaces of a sheet-shaped base material made of a heat-resistant material and then applying a heat-resistant coating on one of the rubber applied surfaces.

There are also hot-press cushioning materials with aramid cloth for surface layers. The hot-press cushioning materials are configured so that the aramid cloth is disposed on outer surfaces of a sheet-shaped material having cushioning properties.

CITATION LIST

Patent Literature

PTL1: Japanese Unexamined Patent Publication No. 2004-344962

PTL2: Japanese Patent No. 3221978

SUMMARY OF INVENTION

Technical Problem

The cushioning-material surface layers shown in Patent Literatures 1 and 2 have relatively hard surfaces. If there is contamination, or foreign matter, caught between the cushioning material and an object to be compressed or a hot platen during press operation, the cushioning material having such a hard surface layer cannot absorb minute unevenness caused by the foreign matter. In short, the cushioning-material has insufficient unevenness followability at the surface. The foreign matter caught between the cushioning material and an object to be compressed or a hot platen forms unevenness in products manufactured by a hot press and therefore may cause defects in the resultant products. In view of the circumstances, the cushioning materials are required to have high unevenness followability to absorb the effect of the minute unevenness caused by the foreign matter. Especially, recent cushioning materials are required to be thinner in addition to the high unevenness followability.

Also, the cushioning materials with the surface layers shown in Patent Literature 1 and 2 exhibit relatively low flexibility. Such low-flexible cushioning materials may be susceptible to wrinkles and cracks, for example, during handling of the cushioning materials. Specifically, general cushioning materials used in a hot press to manufacture laminated plates measure a few meters by a few meters in size. When a cushioning material is lifted up with its end parts locally, the cushioning material hangs down under its own weight and thereby may become partially cracked or wrinkled. In view of the circumstances, cushioning materials with high flexibility, excellent portability and handleability are in demand.

When aramid cloth is used as the surface layer of a cushioning material, repeated use of the cushioning material makes the outer surfaces of the surface layers fuzzy. Because the fuzz can cause contamination, decreasing fuzz formation is demanded. Especially, recent laminated plates, which are made of polyimide resin or the like, are subjected to hot pressing at relatively high temperature, for example, at 200° C. or higher. In such high-temperature hot pressing, noticeable deterioration is seen especially in the fibers of the aramid cloth, and therefore fuzz is frequently generated. If the aramid cloth is used as the surface layers, deterioration after hot pressing hardens the surface, resulting in deterioration in the unevenness followability.

An object of the present invention is to provide a cushioning-material surface layer with excellent unevenness followability and less susceptibility to crazings, wrinkles and cracks.

Another object of the present invention is to provide a hot-press cushioning material with excellent unevenness followability and less susceptibility to crazings, wrinkles and cracks.

Solution to Problem

The inventors of the present invention focused attention on imparting the cushioning property not only to a cushion body, which is an internal layer of a cushioning material, but also to the cushioning-material surface layer disposed on outer surfaces of the cushioning material. From the aforementioned viewpoints, the cushioning-material surface layer of course needs to be less susceptible to fuzz and to have good releasability and good adhesive property to the cushion body which is an internal layer.

The cushioning-material surface layer according to one aspect of the present invention is a sheet-shaped cushioning-material surface layer disposed on an outer surface of a hot-press cushioning material and includes a resin layer that is disposed on one side of the surface layer to cover the side of the surface layer, a rubber layer that is disposed on the other side of the surface layer to cover the side of the surface layer, and a woven fabric layer that is disposed between the resin layer and the rubber layer and includes bulked yarns for at least one of warp and weft. The woven fabric layer includes a woven fabric-resin composite layer that is disposed on the resin layer side and made by impregnating part of a woven fabric as a base material with resin which forms the resin layer and a woven fabric-rubber composite layer that is disposed on the rubber layer side and made by impregnating part of the woven fabric with rubber which forms the rubber layer. The woven fabric layer includes interstices therein.

In the surface layer according to the present invention, the woven fabric layer includes warp and weft, at least one of the warp and weft being bulked yarns. The bulked yarn is a glass fiber yarn made by drafting short fibers, which are not parallel with each other, intertwined with each other and tangled, and occupying a relatively large area. In other words, the bulked yarn is voluminous like wool, and therefore the woven fabric made of the bulked yarn includes a lot of interstices unlike general woven fabric.

In the woven fabric-resin composite layer, the resin used to impregnate the woven fabric appropriately flows into the interstices in the bulked yarns and interstices between the interlaced yarns of the woven fabric, but does not completely fill up the interstices to keep the interstices to a certain extent. In the woven fabric-rubber composite layer, similarly, the rubber used to impregnate the woven fabric appropriately flows into the interstices in the bulked yarns and interstices between the interlaced yarns of the woven fabric, but does not completely fill up the interstices and maintains the property provided by the interstices to a certain extent. Since such interstices are mostly enclosed by resin or rubber, the interstices have high resilience to recover their original shapes even if a pressure enough to squeeze the interstices is applied.

Specifically, the cushioning-material surface layer having the interstices inside the woven fabric layer between the resin layer disposed on one side of the surface layer and the rubber layer disposed on the other side of the surface layer can have excellent unevenness followability and high flexibility. Even if minute foreign matter is caught between the cushioning material and an object to be compressed or a hot platen, such a cushioning material can absorb the effects of unevenness caused by the foreign matter. Therefore, the products can be less affected by the unevenness. Since the cushioning-material surface layer has high flexibility, it is also possible to reduce the occurrence of crazings, wrinkles and cracks. In addition, the cushioning-material surface layer with a resin layer on one side can reduce fuzz formation as well as improve releasability from the hot platen. The cushioning-material surface layer with a rubber layer on the other side can enhance the adhesive property to the cushion body.

The woven fabric layer is configured so that one of the warp and weft, which form the woven fabric, is bulked yarns; however, of course, both of the warp and weft can be bulked yarns. In the case where either one of the warp and weft is bulked yarns, the other can be regular single yarns or twisted yarns. Types of the bulked yarn include a staple yarn, a sliver yarn, and so on. The bulked yarn is, for example, a yarn processed by an air jet or the like so as to have a greater volume. The staple yarn is made by spinning a glass short-fiber wad into a thread. The sliver yarn is made by twisting untwisted voluminous short fibers (sliver).

The residual interstice ratio of the woven fabric layer to the woven fabric as a base material is 70% or higher. The woven fabric layer having the residual interstice ratio can more reliably secure unevenness followability and high flexibility.

A description will be now made about the residual interstice ratio. First, the interstice ratio of the woven fabric as a base material, in other words, a woven fabric that is not impregnated with resin or rubber, is determined. Before the interstice ratio is determined, the volume of the whole woven fabric is determined by multiplying the thickness by the area of the woven fabric, the volume of the bulked yarn is determined using the mass per unit area and the specific gravity of the bulked yarns, and the volume of interstices is determined by subtracting the volume of the bulked yarns from the volume of the whole woven fabric. Then, the ratio of the volume of the interstices to the volume of the whole woven fabric is calculated to obtain the interstice ratio. Furthermore, the interstice ratio of the woven fabric impregnated with resin and rubber is determined using the specific gravity of the rubber and resin. The residual interstice ratio is the ratio of the interstice ratio of the woven fabric impregnated with resin and rubber to the interstice ratio of the woven fabric not impregnated with resin and rubber. The residual interstice ratio indicates how much volume of the interstices remains in the woven fabric impregnated with resin and rubber with respect to the volume of the interstices in the woven fabric not impregnated with resin and rubber.

The resin is preferably heat resistant resin that is resistant to heat generated by the hot press. Specifically, an example of preferable heat resistant resin has a melting point and a glass transition point, at least one of them being 200° C. or higher. Recently, hot press is required to work at high temperatures. For example, in order to enhance heat resistance of resultant products, the resin used to form the products is also heat resistant resin. Because of this, the cushioning-material surface layer is also required to be made from resin resistant to 200° C. or higher. If at least one of the melting point and glass transition point of the resin is 200° C. or higher, the cushioning-material surface layer can withstand hot pressing operation at high temperatures, e.g., about 200° C., to yield products made of heat resistant resin. It is of course no problem for the resin to have both the melting point and glass transition point of 200° C. or higher.

The resin is preferably a single resin or a mixture of two or more resins selected from the group consisting of fluororesin, phenol resin, melamine resin, epoxy resin, unsaturated polyester resin, silicone resin, polyimide resin, thermosetting acrylic resin, furan resin, urea resin, diallyl phthalate resin, and polyurethane resin. Especially, fluororesin is most preferable because it has good heat resistance and other properties.

It is also preferable for the resin to contain electrically-conductive inorganic powder. The electrically-conductive inorganic powder can reduce charge generation on the resin which is relatively likely to be charged. The inorganic powder is preferably a single powder or a mixture of two or more powders selected from the group consisting of carbon powder, aluminum powder, titanium oxide powder, zinc oxide powder and iron oxide powder. The average diameter of the inorganic powder is preferably 0.1 µm to 10.0 µm.

The woven fabric is preferably made from bulked yarns made of glass fibers. Commercially available woven fabrics using bulked yarns of glass fibers are, for example, A305, A330, A400, A415, A450, A500, T330, T540, T790, T860, and T900 made by Unitika Ltd., KS4010, KS4155, and KS4325 made by Nitto Boseki Co., Ltd., and the like. The woven fabric can be also made from aramid fibers.

The woven fabric may be a single-weave woven fabric or multiple-weave woven fabric. There are some weaves, including a plain weave, and a twilled weave; however, the present invention is not limited to a specific weave. The accuracy of the mass per unit area and the interstice ratio of the woven fabric can be adjusted by appropriately selecting a yarn count, a weave density, a weaving method, and the like.

The preferable rubber is a single rubber or a mixture of two or more rubbers selected from the group consisting of fluororubber, EPM, EPDM, hydrogenated nitrile rubber, silicone rubber, acrylic rubber, and butyl rubber. These rubbers are excellent in heat resistance and therefore are preferable for the hot press. Especially, fluororubber is most preferable in terms of the heat resistance and the physical properties such as strength.

Another aspect of the present invention is directed to a hot-press cushioning material that is used in a hot press and includes a sheet-shaped cushioning-material surface layer disposed on the outer surface of the cushioning material. The cushioning-material surface layer includes a resin layer that is disposed on one side of the surface layer to cover the side of the surface layer, a rubber layer that is disposed on the other side of the surface layer to cover the side of the surface layer, and a woven fabric layer that is disposed between the resin layer and the rubber layer and includes bulked yarns for at least one of warp and weft. The woven fabric layer includes a woven fabric-resin composite layer that is disposed on the resin layer side and made by impregnating part of a woven fabric as a base material with resin which forms the resin layer and a woven fabric-rubber composite layer that is disposed on the rubber layer side and made by impregnating part of the woven fabric with rubber which forms the rubber layer. The woven fabric layer includes interstices therein.

Such a hot-press cushioning material can have excellent unevenness followability and less susceptible to crazings, wrinkles, and cracks. Therefore, the hot-press cushioning material can efficiently manufacture satisfactory products, while having good handleability and improved durability.

Advantageous Effects of Invention

According to the cushioning-material surface layer of the present invention, the interstices provided in the woven fabric layer interposed between a resin layer disposed on one side of the woven fabric layer and a rubber layer disposed on the other side thereof can impart excellent unevenness followability and high flexibility. Even if minute foreign matter is caught between the cushioning material and an object to be compressed or a hot platen, such a cushioning material can absorb the effects of unevenness caused by the foreign matter. Therefore, the products can be less affected by the unevenness. Since the cushioning-material surface layer has high flexibility, it is also possible to reduce the occurrence of crazings, wrinkles and cracks.

Furthermore, the hot-press cushioning material according to the invention can efficiently manufacture satisfactory products, while having good handleability and improved durability.

DESCRIPTION OF EMBODIMENTS

Figure 1:
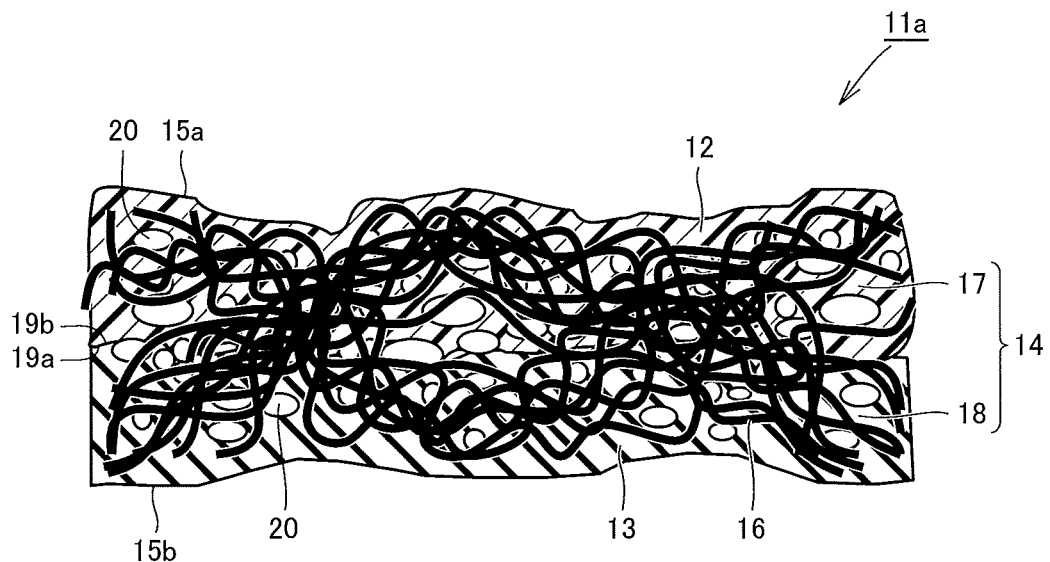
FIG. 1 is a schematic diagram of a cushioning-material surface layer that is cut along the thickness direction according to an embodiment of the present invention.
Figure 2:
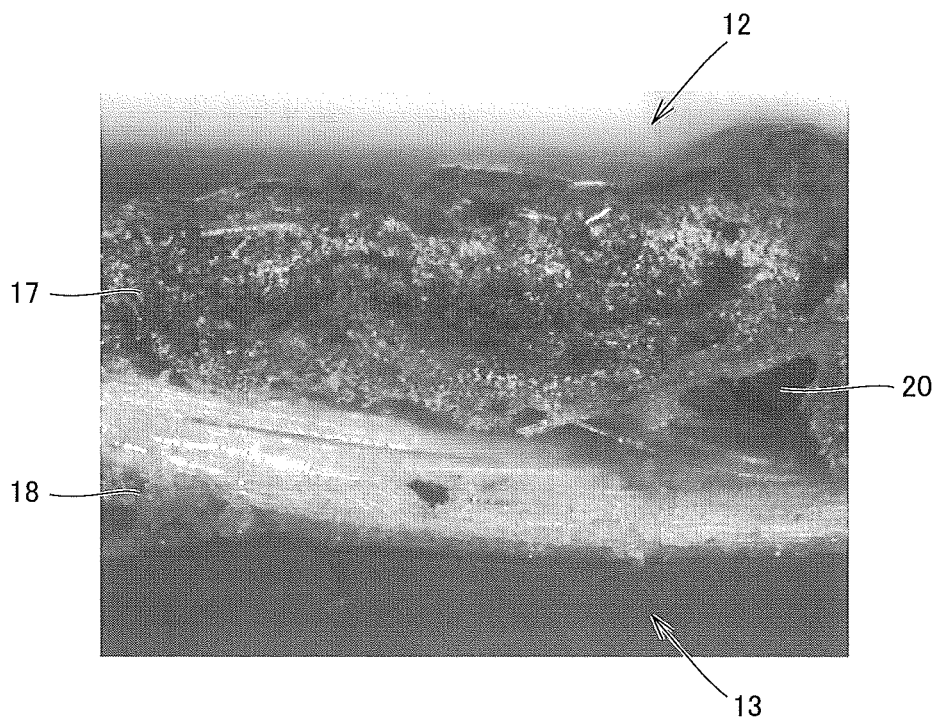
FIG. 2 is a photograph of a cross section of the cushioning-material surface layer according to the embodiment of the invention, magnified by about 60 times.
Figure 3:
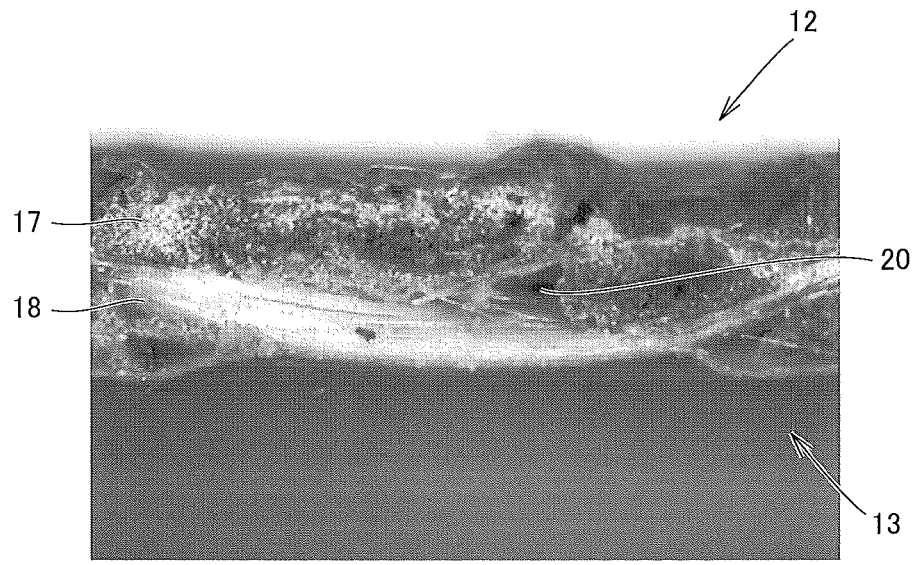
FIG. 3 is a photograph of a cross section of the cushioning-material surface layer according to the embodiment of the invention, magnified by about 32 times.

With reference to the drawings, embodiments of the present invention will be described below. FIG. 1 is a schematic diagram of a cushioning-material surface layer that is cut along the thickness direction according to an embodiment of the present invention. FIG. 2 is a photograph of a cross section of the cushioning-material surface layer according to the embodiment of the invention, magnified by about 60 times. FIG. 3 is a photograph of a cross section of the cushioning-material surface layer according to the embodiment of the invention, magnified by about 32 times. FIG. 1 schematically depicts the cushioning-material surface layer according to the embodiment of the invention on the basis of FIGS. 2 and 3.

Referring to FIGS. 1 to 3, a cushioning-material surface layer 11a according to the embodiment of the invention is a surface layer of a hot-press cushioning material, which will be described later, and more specifically is disposed on the front side and back side of the hot-press cushioning material.

The cushioning-material surface layer 11a is a kind of a sheet. The surface layer 11a includes a resin layer 12 that is disposed on one side of the surface layer 11a to cover the side thereof and a rubber layer 13 that is disposed on the other side of the surface layer 11a to cover the side thereof. A woven fabric layer 14 is disposed between the resin layer 12 and rubber layer 13. In other words, the woven fabric layer 14 is disposed so that the resin layer 12 and rubber layer 13 sandwich the woven fabric layer 14 in the thickness direction of the surface layer 11a. The resin layer 12 has a relatively smooth outer surface 15a, while the rubber layer 13 has a relatively smooth outer surface 15b. The woven fabric layer 14, more specifically, bulked yarns 16 forming the woven fabric layer 14 are hardly exposed at the outer surfaces 15a, 15b.

An applicable woven fabric as the woven fabric layer 14 has bulked yarns 16 for at least one of the warp and weft. Used for the bulked yarns 16 is, for example, glass fiber or aramid fiber formed into bulked yarns.

Although it is not illustrated in FIG. 1, the resin layer 12 contains electrically-conductive inorganic powder. The inorganic powder can reduce charge generation on the resin which is relatively likely to be charged.

The woven fabric layer 14 includes a woven fabric-resin composite layer 17 that is disposed on the resin layer 12 side and is made by impregnating part of a woven fabric as a base material with resin which forms the resin layer 12 and a woven fabric-rubber composite layer 18 that is disposed on the rubber layer 13 side and is made by impregnating part of the woven fabric with rubber which forms the rubber layer 13. The woven fabric-resin composite layer 17 and woven fabric-rubber composite layer 18 have surfaces 19a, 19b that face each other and make contact with each other at most areas.

In short, the surface layer 11a includes the resin layer 12, woven fabric-resin composite layer 17, woven fabric-rubber composite layer 18, and rubber layer 13 arranged in this order from the top in FIG. 1. The resin layer 12 and woven fabric-resin composite layer 17 are continuously connected with each other at most areas, while the rubber layer 13 and woven fabric-rubber composite layer 18 are continuously connected with each other at most areas. On the other hand, the woven fabric-resin composite layer 17 and woven fabric-rubber composite layer 18 are not always continuously connected with each other at most areas, but some interstices positioned in the woven fabric or between woven fabrics are present between the woven fabric-resin composite layer 17 and woven fabric-rubber composite layer 18. FIG. 1 depicts the woven fabric-resin composite layer 17 and woven fabric-rubber composite layer 18 of almost the same thickness and the relatively thin resin layer 12 and rubber layer 13; however, the thickness of the layers can be changed according to the applications and purposes.

The woven fabric layer 14 includes interstices 20 therein. As shown in FIG. 1, the interstices 20 are provided in the woven fabric-resin composite layer 17 and woven fabric-rubber composite layer 18, respectively. Most of the interstices 20 are the remainder of the interstices originally contained in the bulked yarns 16 that form the woven fabric layer 14 as a base material. These interstices are mostly enclosed by the resin or rubber. Therefore, the interstices have high resilience so that the interstices can recover their original shapes during depressurization even if enough pressure to squeeze the interstices is applied.

A brief description about a method for manufacturing the aforementioned surface layer 11a will be made. First, a sheet-shaped woven fabric having the aforementioned configuration is prepared. Then, one side of the sheet-shaped woven fabric is impregnated with resin. The resin used herein may be dissolved in a solvent or may be made into a varnish form to make the resin easy to permeate into the woven fabric. In addition, electrically-conductive inorganic powder can be added to the resin in advance. During impregnation, the woven fabric is impregnated with resin so that a resin layer is formed on one side of the woven fabric, but the resin does not spread into the other side of the woven fabric. In other words, impregnation is performed so that the woven fabric has one side with the resin layer exposed and the other side with the bulked yarns, which form the woven fabric, exposed. In this manner, the resin layer and woven fabric-resin composite layer are firstly formed. Then, the resin layer and woven fabric-resin composite layer are calcined to volatilize the solvent and thereby to be cured.

Next, the other side of the woven fabric is impregnated with rubber. This impregnation process is performed so that the rubber forms a rubber layer on the other side of the woven fabric and spreads in the direction of the thickness of the woven fabric. More specifically, for example, an unvulcanized fluororubber with a low viscosity is applied from the other side of the woven fabric to achieve impregnation. Subsequently, the woven fabric is dried for a predetermined period of time.

Thus, the surface layer according to the invention is manufactured. The degree of impregnation, more specifically, for example, the viscosity of the resin in a varnish form, the impregnation time, the impregnation temperature, the state of the unvulcanized fluororubber applied on the woven fabric, the state of the texturized yarns intertwined in the woven fabric and other factors are considered to adjust the percentage of interstices to remain in the woven fabric, i.e., the residual interstice ratio.

Since the surface layer contains interstices therein, more specifically in the woven fabric layer disposed in the surface layer as described above, the surface layer itself exhibits unevenness followability as well as high flexibility. The resin layer formed on one side of the surface layer imparts good releasability, while the rubber layer formed on the other side imparts good adhesive property.

Figure 4:
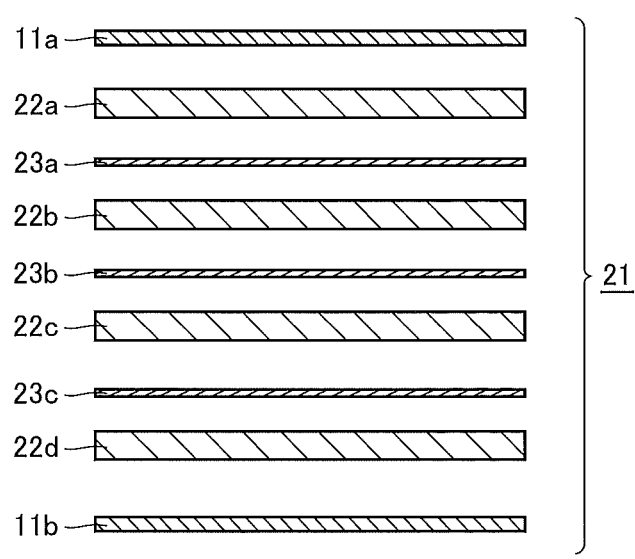
FIG. 4 is a schematic cross-sectional view of the hot-press cushioning material including the cushioning-material surface layer according to the embodiment of the invention, the cushioning material being cut along the thickness direction and illustrated separately element by element.

Next, the structure of a hot-press cushioning material including the cushioning-material surface layer shown in FIG. 1 will be described. FIG. 4 is a schematic cross-sectional view of the hot-press cushioning material including the cushioning-material surface layer according to the embodiment of the invention, the cushioning material being cut along the thickness direction and illustrated separately element by element.

Referring to FIG. 4, a hot-press cushioning material 21 includes two surface layers 11a, 11b configured as described above and four cushion bodies 22a, 22b, 22c, 22d.

The hot-press cushioning material 21 has the two surface layers 11a, 11b arranged on one side which is a front surface and on the other side which is a back surface, respectively. Provided on the front side is the first surface layer 11a that is disposed such that its resin layer is positioned on the outer surface, or on the upper side in FIG. 4. On the other hand, the second surface layer 11b provided on the back side is disposed such that its resin layer is positioned on the outer surface, or on the lower side in FIG. 4. The first surface layer 11a is attached with the outer surface of the rubber layer adhering to a surface of the cushion body 22a. The second surface layer 11b is attached with the outer surface of the rubber layer adhering to a surface of the cushion body 22d. Specifically, the unvulcanized fluororubber and the cushion bodies making contact with each other are applied with pressure and heat to vulcanize the unvulcanized fluororubber while adhering and integrating all the layers and bodies into one piece. Each of the cushion bodies 22a to 22d are bonded with adhesive members 23a, 23b, 23c each interposed therebetween in the thickness direction. The hot-press cushioning material 21 is configured in this manner.

The hot-press cushioning material 21 has good releasability from hot platens and objects to be compressed due to the first and second surface layers 11a, 11b, more specifically, the resin layers in the first and second surface layers 11a, 11b. Therefore, the resin layers in the first and second surface layers can reduce the adhesion of the hot-press cushioning material to the hot platen and object to be compressed even when the hot-press cushioning material is sandwiched between the hot platen and the object during hot pressing. In addition, the hot-press cushioning material 21 has a good adhesive property with the cushion bodies 22a, 22b due to the first and second surface layers 11a, 11b, more specifically, the rubber layers in the first and second surface layers 11a, 11b.

Furthermore, the hot-press cushioning material 21 has good unevenness followability and good flexibility due to the first and second surface layers 11a, 11b, thereby efficiently manufacturing satisfactory products, while exhibiting good handleability and improved durability.

EXAMPLES

For the woven fabric, a glass woven fabric "A515" (manufactured by UNITIKA LTD.) made from bulked yarns is prepared. The glass fiber has a specific gravity of 2.54 (g/m$^3$) and a mass per unit area of 515 (g/m$^2$). Fluororesin in a varnish form is applied on one side of the prepared glass woven fabric and then calcined. The fluororesin has a specific gravity of 1.71 (g/m$^3$). The fluororesin is compounded with a predetermined amount of electrically-conductive inorganic oxide "23K" (manufactured by Hakusui Tech Co., Ltd.). After the calcining step, unvulcanized fluororubber is applied on the back side of the glass woven fabric and then dried. The fluororubber has a specific gravity of 1.96 (g/m$^3$). Through the process, the surface layer with the above-described configuration is obtained.

The cushion bodies are manufactured as below. First, a glass woven fabric "T860" (manufactured by UNITIKA LTD.) made from bulked yarns is prepared and impregnated with unvulcanized fluororubber. Then, the glass woven fabric is fully dried to remove the solvent. Subsequently, the glass woven fabric is baked at 230° C. for five hours to obtain a cushion body. For detailed information about the configuration and manufacturing method of the cushion body, reference should be made to Japanese Unexamined Patent Application Publication No. 2008-132656.

The cushion body obtained through the aforementioned process is interposed between two surface layers to manufacture the hot-press cushioning material according to the present invention. The characteristics and properties of the hot-press cushioning material are evaluated as those of Example 1.

A surface layer described in Patent Literature 1 is used as Comparative Example 1. The specific configuration of Comparative Example 1 will be described. A hot-press sheet, serving as the surface layer, is made of a glass cloth "H201" (manufactured by UNITIKA LTD.) with a mass per unit area of 200 (g/m$^2$). The glass cloth has a release coat of 30 (g/m$^2$) applied on one side thereof and fluororubber applied on the back side thereof. The release coat has a specific gravity of 1.09 (g/m$^3$). The fluororubber has a specific gravity of 2.22 (g/m$^3$).

The surface layer of Comparative Example 2 is made from an aramid cloth alone. The aramid cloth has a specific gravity of 1.37 (g/m$^3$) and a mass per unit area of 200 (g/m$^2$).

In Comparative Example 3, an untreated bulky cloth, that is, a glass woven fabric "A515" of Example 1 in which neither resin layer nor rubber layer is formed is used as the surface layer.

A surface layer described in Patent Literature 2 is used as Comparative Example 4. The specific configuration of Comparative Example 4 will be described. An adhesive sheet, serving as the surface layer, is made of a glass cloth "H201" (manufactured by UNITIKA LTD.) with a mass per unit area of 200 (g/m$^2$). The adhesive sheet is made by applying unvulcanized fluororubber on both sides of the glass cloth and then applying polyimide resin-based heat-resistant coat on the fluororubber. The resin has a specific gravity of 2.19 (g/m$^3$). The fluororubber used herein is the same as that in Comparative Example 1.

Comparative Examples 1 to 4 employ the same cushion bodies as those used in Example 1. That is, the cushioning materials in Example 1 and Comparative Examples 1 to 4 are different only in the surface layers.

[Table 1]
[Table 2]

The results shown in Tables 1 and 2 are obtained under the press conditions, at a temperature of 230° C. under a pressure load of 4 MPa. One press cycle consists of 60-minute heating and 15-minute cooling. In the tables, the item "after 10 presses" denotes that the specimens were measured after being pressed 10 times. Also, in Table 1, "-" denotes that the specimens were not measured, and "0" in the field of air permeability denotes that air does not pass through the specimens at all, in other words, hermeticity is the best. In Table 2, symbol "○" presents "good" condition, symbol "Δ" presents "somewhat problematic" condition, and symbol "x" presents "problematic" condition. "Amount of resin adhesion" in Table 1 is an amount of resin adhering to the woven fabric when the woven fabric was impregnated with the resin, i.e., an amount of resin present in the resin layer and the woven fabric-resin composite layer. "Amount of rubber adhesion" is an amount of rubber adhering to the woven fabric when the woven fabric was impregnated with the rubber, i.e., an amount of rubber present in the rubber layer and the woven fabric-rubber composite layer.

Figure 5:
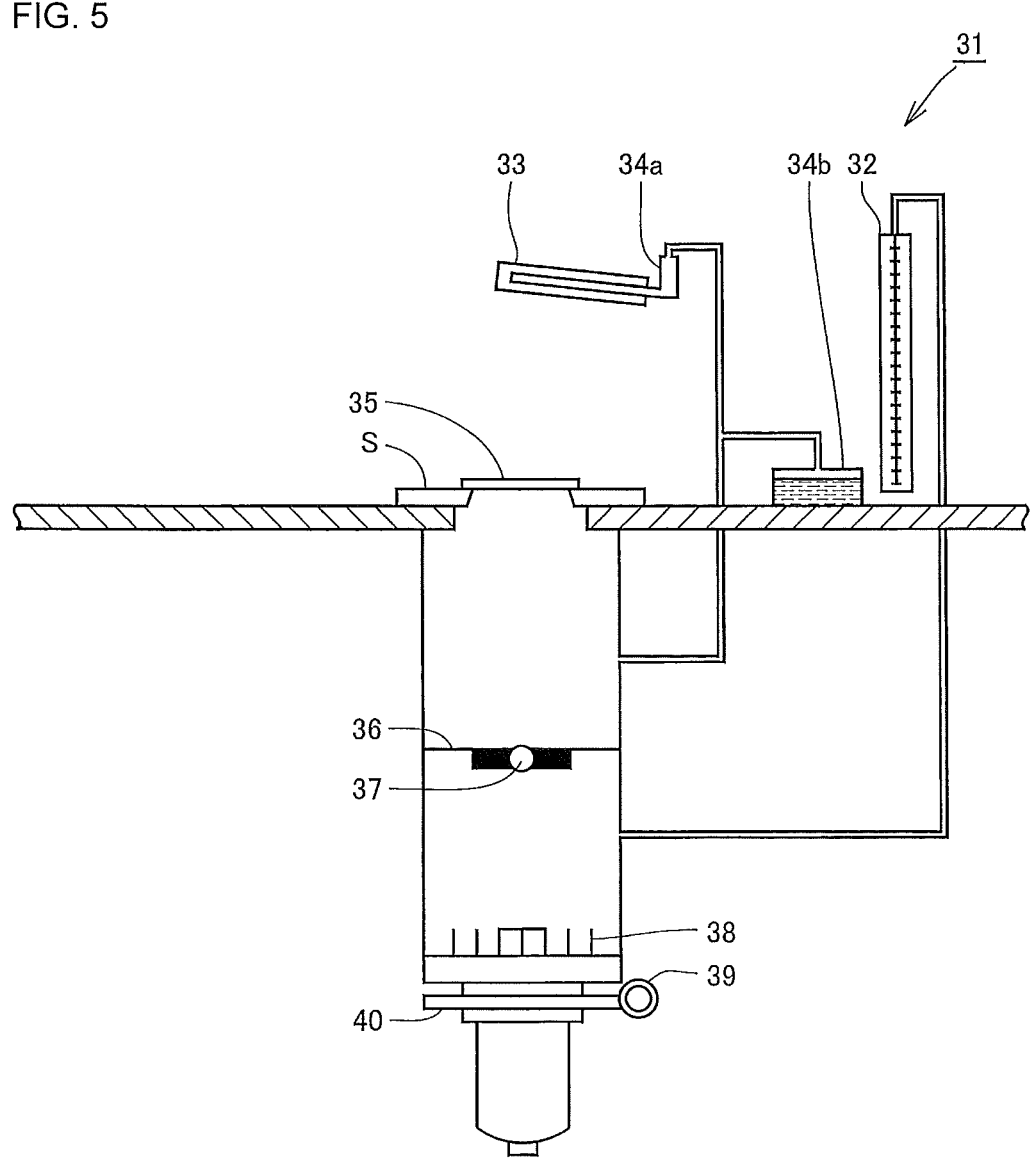
FIG. 5 is a schematic diagram of a Frazir type tester used to test the air permeability.

The air permeability is obtained by an air permeability test which is in conformity with JIS R3420 (2006) and will be briefly described below. The air permeability test was performed with a Frazir type tester 31 shown in FIG. 5. The Frazir type tester 31 includes a vertical type barometer 32, an inclined type barometer 33, two oil reservoirs 34a, 34b, a clamp 35 for holding a test specimen S, a cylindrical partition 36, an air hole 37, a baffle plate 38, an air exhaust 39, and a suction fan 40.

The operation method will be described below. A test specimen S is mounted on one end of a cylinder and is held by the clamp 35 and secured. The suction fan 40 is adjusted by a rheostat so that the inclined type barometer 33 shows a pressure of 124.5 Pa. The air volume cm$^3 \times$cm$^{-2} \times$s$^{-1}$ (cm$^3$/cm$^2$ sec) passing through the test specimen S is obtained by aid of the table attached to this tester considering the pressure that the vertical type barometer 32 shows at that time and the type of the air hole 37 used.

It is preferable for air permeability, or hermeticity, to be low in terms of the facilitation of suction transport and other factors when handling the hot-press cushioning material.

Referring to Table 1, the residual interstice ratio of Example 1 is 85.2% in the initial stage and 70.5% after 10 presses. Example 1 still has a residual interstice ratio of 70% or higher even after 10 presses. On the other hand, the residual interstice ratio of Comparative Example 1 is 68.4% in the initial stage and 46.9% after 10 presses. The residual interstice ratio of Comparative Example 4 is 68.3% in the initial stage and 51.3% after 10 presses. Both Comparative Examples have residual interstice ratios lower than 70%. As to air permeability, Example 1 exhibits 0.2 ($cm^3/cm^2$ sec) in the initial stage and 0 after 10 presses, which demonstrates that the hermeticity is very high. Comparative Examples 1 and 4 also have good hermeticity; however, Comparative Examples 2 and 3 exhibit 14.9 ($cm^3/cm^2$ sec) and 19.5 ($cm^3/cm^2$ sec) in the initial stage and 1.0 ($cm^3/cm^2$ sec) and 2.0 ($cm^3/cm^2$ sec) after 10 presses, respectively. It can be said that Comparative Examples 2 and 3 have a problem in hermeticity.

Referring to Table 2, the hot-press cushioning material of Example 1 is good in terms of all the unevenness followability, bending wrinkle, fuzz formation, and releasability in the initial stage and even after 10 presses. On the contrary, Comparative Examples 1 and 4 have problems in the unevenness followability and bending wrinkle both in the initial stage and after 10 presses. The releasability is also insufficient. Comparative Example 2 has a problem in releasability in the initial stage and also exhibits unsatisfactory fuzz formation. After 10 presses, Comparative Example 2 has problems in all items but bending wrinkle. Comparative Example 3 has a problem in fuzz formation in the initial stage. After 10 presses, Comparative Example 3 has problems in the unevenness followability and fuzz formation.

As described above, Example 1 exhibits favorable unevenness followability, bending wrinkle, fuzz formation, and releasability in addition to hermeticity. On the other hand, Comparative Examples 1 to 4 have at least one problem among the aforementioned properties.

Although, in the above-described embodiment, the hot-press cushioning material is configured to include two surface layers and four cushion bodies, the hot-press cushioning material of the present invention is not limited thereto and can have the following configuration.

Figure 6:
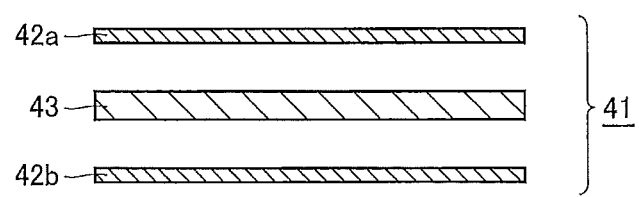
FIG. 6 is a schematic cross-sectional view of a hot-press cushioning material including a cushioning-material surface layer according to another embodiment of the invention, the cushioning material being cut along the thickness direction and illustrated separately element by element.

FIG. 6 is a schematic cross-sectional view of a hot-press cushioning material including a cushioning-material surface layer according to another embodiment of the invention, the cushioning material being cut along the thickness direction and illustrated separately element by element. Referring to FIG. 6, a hot-press cushioning material 41 includes two surface layers 42*a*, 42*b* and a single cushion body 43. The two surface layers 42*a*, 42*b* are disposed on the front side and back side of the cushion body 43, respectively. Similar to the cushioning material shown in FIG. 4, the rubber layers of the surface layers 42*a*, 42*b* adhere to both sides of the cushion body 43, respectively. The hot-press cushioning material may be configured in this manner.

Figure 7:
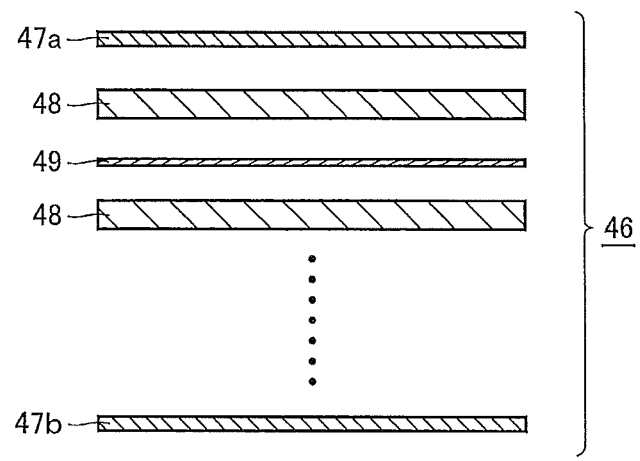
FIG. 7 is a schematic cross-sectional view of a hot-press cushioning material including a cushioning-material surface layer according to yet another embodiment of the invention, the cushioning material being cut along the thickness direction and illustrated separately element by element.

In addition, as shown in FIG. 7, a cushioning material 46 may include two surface layers 47*a*, 47*b* and a plurality of cushion bodies 48. Specifically, the cushion bodies 48 are bonded to each other with adhesives 49 interposed therebetween and the two surface layers 47*a*, 47*b* are disposed on the front side and the back side, which are the outermost surfaces of the cushioning material 46, respectively. The hot-press cushioning material may be configured in this manner.

Figure 8:
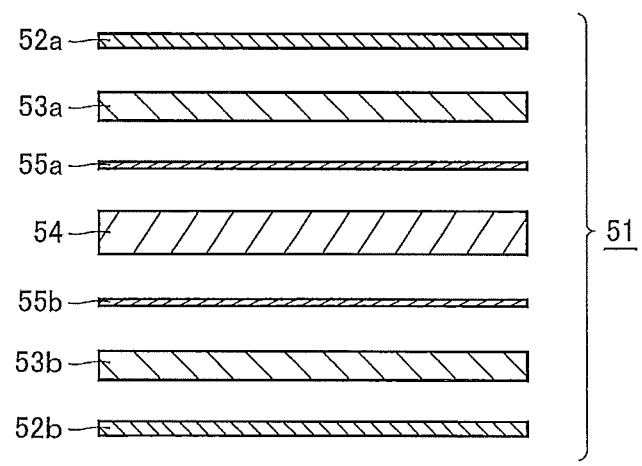
FIG. 8 is a schematic cross-sectional view of a hot-press cushioning material including a cushioning-material surface layer according to yet another embodiment of the invention, the cushioning material being cut along the thickness direction and illustrated separately element by element.

Furthermore, as shown in FIG. 8, a cushioning material 51 may include a sheet-shaped fluororubber 54 in addition to two surface layers 52*a*, 52*b* and two cushion bodies 53*a*, 53*b*. In this case, the fluororubber 54 and cushion bodies 53*a*, 53*b* are bonded to each other with adhesives 55*a*, 55*b* interposed therebetween. The hot-press cushioning material may be configured in this manner.

In the above-described embodiments, heat resistant resin is used as resin; however, the present invention is not limited thereto, but can use resin without heat resistance properties if pressing is performed without the application of high-temperature heat. In this case, rubber without heat resistance properties can be used.

The foregoing has described the embodiments of the present invention by referring to the drawings. However, the invention should not be limited to the illustrated embodiments. It should be appreciated that various modifications and changes can be made to the illustrated embodiments within the scope of the appended claims and their equivalents.

INDUSTRIAL APPLICABILITY

The cushioning-material surface layer and the hot-press cushioning material according to the present invention are effectively used to achieve favorable productivity and so on of laminated plates.

REFERENCE SIGNS LIST

11*a*, 11*b*, 42*a*, 42*b*, 47*a*, 47*b*, 52*a*, 52*b*: surface layer, 12; resin layer, 13; rubber layer, 14; woven fabric layer, 15*a*, 15*b*: outer surface, 17; woven fabric-resin composite layer, 18; woven fabric-rubber composite layer, 19*a*, 19*b*: surface, 20; interstice, 21, 41, 46, 51; cushioning material, 22*a*, 22*b*, 22*c*, 22*d*, 43, 48, 53*a*, 53*b*: cushion body, 23*a*, 23*b*, 23*c*, 49, 55*a*, 55*b*: adhesive, 31; Frazir type tester, 32; vertical type barometer, 33; inclined type barometer, 34*a*, 34*b*: oil reservoir, 35; clamp, 36; partition, 37; air hole, 38; baffle plate, 39; air exhaust, 40; suction fan, and 54; fluororubber.

TABLE 1

| | | MASS OF RESIN ADHESION ($g/m^2$) | MASS OF RUBBER ADHESION ($g/m^2$) | THICKNESS (mm) | VOLUME ($m^3$) | | | | | RESIDUAL INTERSTICE RATIO (%) | RESIDUAL INTERSTICE RATIO (%) | AIR PERMEABILITY ($cm^3/cm^2sec$) |
|---|---|---|---|---|---|---|---|---|---|---|---|---|
| | | | | | GLASS BASE MATERIAL | RUBBER | RESIN | INTERSTICE | TOTAL | | | |
| EXAMPLE 1 | INITIAL STAGE | 180 | 50 | 0.95 | 0.00020 | 0.000026 | 0.000105 | 0.00062 | 0.00095 | 64.9 | 85.2 | 0.2 |
| | AFTER 10 PRESSES | 180 | 50 | 0.72 | 0.00020 | 0.000026 | 0.000105 | 0.00039 | 0.00072 | 53.7 | 70.5 | 0 |
| COMPAR- | INITIAL | 30 | 50 | 0.22 | 0.00008 | 0.000023 | 0.000028 | 0.00009 | 0.00022 | 41.5 | 68.4 | 0 |

TABLE 1-continued

| | | MASS OF RESIN ADHESION (g/m²) | MASS OF RUBBER ADHESION (g/m²) | THICK-NESS (mm) | VOLUME (m³) | | | | | INTER-STICE RATIO (%) | RESIDUAL INTER-STICE RATIO (%) | AIR PERMEABILITY (cm³/cm²sec) |
|---|---|---|---|---|---|---|---|---|---|---|---|---|
| | | | | | GLASS BASE MATERIAL | RUBBER | RESIN | INTER-STICE | TOTAL | | | |
| ATIVE EXAMPLE 1 | STAGE AFTER 10 PRESSES | 30 | 50 | 0.18 | 0.00008 | 0.000023 | 0.000028 | 0.00005 | 0.00018 | 28.5 | 46.9 | 0 |
| COMPARATIVE EXAMPLE 2 | INITIAL STAGE | — | — | 0.40 | 0.00015 | — | — | 0.00025 | 0.00040 | 63.5 | — | 14.9 |
| | AFTER 10 PRESSES | — | — | 0.25 | 0.00015 | — | — | 0.00010 | 0.00025 | 41.6 | — | 1.0 |
| COMPARATIVE EXAMPLE 3 | INITIAL STAGE | — | — | 0.85 | 0.00020 | — | — | 0.00065 | 0.00085 | 76.1 | — | 19.5 |
| | AFTER 10 PRESSES | — | — | 0.20 | 0.00008 | — | — | 0.00012 | 0.00020 | 60.6 | — | 2.0 |
| COMPARATIVE EXAMPLE 4 | INITIAL STAGE | 19 | 66 | 0.20 | 0.00008 | 0.000030 | 0.000009 | 0.00008 | 0.00020 | 41.4 | 68.3 | 0 |
| | AFTER 10 PRESSES | 19 | 66 | 0.17 | 0.00008 | 0.000030 | 0.000009 | 0.00005 | 0.00017 | 31.1 | 51.3 | 0 |

TABLE 2

| | INITIAL STAGE | | | | AFTER 10 PRESSES | | | |
|---|---|---|---|---|---|---|---|---|
| | UNEVENNESS FOLLOWABILITY | BENDING WRINKLE | FUZZ FORMATION | RELEASABILITY | UNEVENNESS FOLLOWABILITY | BENDING WRINKLE | FUZZ FORMATION | RELEASABILITY |
| EXAMPLE 1 | ○ | ○ | ○ | ○ | ○ | ○ | ○ | ○ |
| COMPARATIVE EXAMPLE 1 | X | X | ○ | Δ | X | X | ○ | Δ |
| COMPARATIVE EXAMPLE 2 | ○ | ○ | Δ | X | X | ○ | X | X |
| COMPARATIVE EXAMPLE 3 | ○ | ○ | X | ○ | X | ○ | X | ○ |
| COMPARATIVE EXAMPLE 4 | X | X | ○ | Δ | X | X | ○ | Δ |

The invention claimed is:

1. A cushioning-material surface layer, which is in the shape of a sheet and is disposed on an outer surface of a hot-press cushioning material, comprising:
   a resin layer that is disposed on one side of the surface layer to cover the side of the surface layer;
   a rubber layer that is disposed on the other side of the surface layer to cover the side of the surface layer; and
   a woven fabric layer that is disposed between the resin layer and the rubber layer and includes bulked yarns for at least one of warp and weft, wherein:
   the woven fabric layer includes a woven fabric-resin composite layer that is disposed on the resin layer side and formed by impregnating part of a woven fabric as a base material with resin that forms the resin layer,
   the woven fabric layer includes a woven fabric-rubber composite layer that is disposed on the rubber layer side and formed by impregnating part of the woven fabric with rubber that forms the rubber layer,
   the woven fabric layer includes interstices therein, and
   a residual interstice ratio of the woven fabric layer against the woven fabric as the base material is 70% or higher.

2. The cushioning-material surface layer according to claim 1, wherein the resin is a heat resistant resin.

3. The cushioning-material surface layer according to claim 2, wherein the heat resistant resin has a melting point and a glass transition point, at least one of the points being 200° C. or higher.

4. The cushioning-material surface layer according to claim 1, wherein the resin is a single resin or a mixture of two or more resins selected from the group consisting of fluororesin, phenol resin, melamine resin, epoxy resin, unsaturated polyester resin, silicone resin, polyimide resin, thermosetting acrylic resin, furan resin, urea resin, diallyl phthalate resin, and polyurethane resin.

5. The cushioning-material surface layer according to claim 1, wherein the resin contains electrically-conductive inorganic powder.

6. The cushioning-material surface layer according to claim 5, wherein the inorganic powder is a single powder or a mixture of two or more powders selected from the group consisting of carbon powder, aluminum powder, titanium oxide powder, zinc oxide powder, and iron oxide powder.

7. The cushioning-material surface layer according to claim 1, wherein the woven fabric is made of glass fiber or aramid fiber formed into bulked yarns.

8. The cushioning-material surface layer according to claim 1, wherein the woven fabric is a single-weave woven fabric or a multiple-weave woven fabric.

9. The cushioning-material surface layer according to claim 1, wherein the rubber is a single rubber or a mixture of two or more rubbers selected from the group consisting of fluororubber, EPM, EPDM, hydrogenated nitrile rubber, silicone rubber, acrylic rubber, and butyl rubber.

10. A hot-press cushioning material used in a hot press comprising:

a cushioning-material surface layer that is in the shape of a sheet and is disposed on an outer surface of the hot-press cushioning material, wherein:

the cushioning-material surface layer includes a resin layer that is disposed on one side of the surface layer to cover the side of the surface layer, a rubber layer that is disposed on the other side of the surface layer to cover the side of the surface layer, and a woven fabric layer that is disposed between the resin layer and the rubber layer and includes bulked yarns for at least one of warp and weft, the woven fabric layer includes a woven fabric-resin composite layer that is disposed on the resin layer side and formed by impregnating part of a woven fabric as a base material with resin that forms the resin layer, the woven fabric layer includes a woven fabric-rubber composite layer that is disposed on the rubber layer side and formed by impregnating part of the woven fabric with rubber that forms the rubber layer, the woven fabric layer includes interstices therein, and a residual interstice ratio of the woven fabric layer against the woven fabric as the base material is 70% or higher.

* * * * *